United States Patent
Ogose

(10) Patent No.: US 8,137,546 B2
(45) Date of Patent: Mar. 20, 2012

(54) FUEL FILTER DEVICE

(75) Inventor: Kensuke Ogose, Sagamihara (JP)

(73) Assignee: NIFCO, Inc., Yokohama-Shi (JP)

( * ) Notice: Subject to any disclaimer, the term of this patent is extended or adjusted under 35 U.S.C. 154(b) by 0 days.

(21) Appl. No.: 12/448,819

(22) PCT Filed: Jan. 9, 2008

(86) PCT No.: PCT/JP2008/050155
§ 371 (c)(1),
(2), (4) Date: Aug. 7, 2009

(87) PCT Pub. No.: WO2008/084816
PCT Pub. Date: Jul. 17, 2008

(65) Prior Publication Data
US 2009/0321347 A1  Dec. 31, 2009

(30) Foreign Application Priority Data
Jan. 10, 2007  (JP) .................................. 2007-002491

(51) Int. Cl.
*B01D 29/13* (2006.01)
*B01D 29/15* (2006.01)
*B01D 35/02* (2006.01)
*F02M 37/22* (2006.01)

(52) U.S. Cl. .................. 210/172.4; 210/416.4; 210/489; 210/483

(58) Field of Classification Search ........................ None
See application file for complete search history.

(56) References Cited

U.S. PATENT DOCUMENTS

| | | | | |
|---|---|---|---|---|
| 3,826,372 A * | 7/1974 | Bell | ........................... | 210/172.4 |
| 3,833,124 A * | 9/1974 | Sugiyama et al. | ............. | 210/460 |
| 4,743,370 A * | 5/1988 | Mizusawa | ..................... | 210/460 |
| 4,783,260 A * | 11/1988 | Kurihara | ....................... | 210/232 |
| 4,851,118 A * | 7/1989 | Kurihara | ....................... | 210/315 |
| 4,874,510 A * | 10/1989 | Akira et al. | ................ | 210/172.4 |
| 5,312,545 A * | 5/1994 | Starin et al. | ................ | 210/172.6 |
| 5,409,608 A * | 4/1995 | Yoshida et al. | ............... | 210/315 |
| 5,547,568 A * | 8/1996 | Sasaki | ......................... | 210/172.4 |
| 5,582,729 A * | 12/1996 | Shioda et al. | ................. | 210/461 |
| 5,716,522 A * | 2/1998 | Chilton et al. | ................ | 210/317 |
| 5,795,468 A * | 8/1998 | Reising et al. | .............. | 210/172.4 |
| 5,902,480 A * | 5/1999 | Chilton et al. | ................ | 210/317 |
| 6,343,589 B1 * | 2/2002 | Talaski et al. | ................. | 123/514 |
| 6,464,872 B1 * | 10/2002 | Honda | ........................ | 210/416.4 |
| 6,471,863 B2 * | 10/2002 | Kojima | ....................... | 210/416.4 |
| 6,874,643 B2 * | 4/2005 | Iwamoto | ....................... | 210/461 |
| 6,951,208 B2 * | 10/2005 | Milton | .......................... | 123/509 |

(Continued)

FOREIGN PATENT DOCUMENTS

JP    H03-175141    7/1991

(Continued)

*Primary Examiner* — Robert James Popovics
(74) *Attorney, Agent, or Firm* — Manabu Kanesaka

(57) ABSTRACT

A filter device includes a bag-shape filter body. The filter device is attached in a manner such that an internal space of the filter body connects through to a fuel intake port in a fuel tank. The filter body includes two or more filter materials overlaying each other. At least one of the filter materials is configured so that a cross sectional area of its fuel passage is different between a primary side and a secondary side of the filter material so as to be a multifunctional filter material having a function of gradually capturing dust having different particle sizes.

1 Claim, 2 Drawing Sheets

U.S. PATENT DOCUMENTS

| | | | |
|---|---|---|---|
| 7,029,582 B2* | 4/2006 | Sato et al. | 210/232 |
| 7,048,851 B2* | 5/2006 | Decaux | 210/186 |
| 7,134,568 B2* | 11/2006 | Moriyama et al. | 220/563 |
| 7,182,869 B2* | 2/2007 | Catlin et al. | 210/416.4 |
| 7,329,339 B2* | 2/2008 | Kimisawa et al. | 210/136 |
| 7,387,111 B2* | 6/2008 | Yu et al. | 123/509 |
| 7,429,322 B2* | 9/2008 | Fujita et al. | 210/172.4 |
| 7,478,729 B2* | 1/2009 | Sato et al. | 210/491 |
| 7,901,572 B2* | 3/2011 | Sato | 210/172.4 |
| 7,964,096 B2* | 6/2011 | Kimisawa et al. | 210/172.4 |
| 8,029,667 B2* | 10/2011 | Santinon | 210/172.6 |
| 8,038,877 B2* | 10/2011 | Stausberg et al. | 210/167.08 |
| 8,052,868 B2* | 11/2011 | Sato et al. | 210/172.4 |
| 2002/0023418 A1* | 2/2002 | Kojima | 55/379 |
| 2003/0057149 A1* | 3/2003 | Iwamoto | 210/486 |
| 2003/0201216 A1* | 10/2003 | Wolford et al. | 210/130 |
| 2004/0007520 A1* | 1/2004 | Rosendahl et al. | 210/435 |
| 2004/0222143 A1* | 11/2004 | Kojima et al. | 210/416.4 |
| 2004/0251194 A1* | 12/2004 | Brzozowski et al. | 210/416.4 |
| 2005/0006300 A1* | 1/2005 | Sato et al. | 210/416.4 |
| 2005/0023201 A1* | 2/2005 | Sato | 210/172 |
| 2005/0029180 A1* | 2/2005 | Kimisawa et al. | 210/172 |
| 2005/0061723 A1* | 3/2005 | Matsushita | 210/171 |
| 2005/0087481 A1* | 4/2005 | Boast et al. | 210/130 |
| 2005/0098508 A1* | 5/2005 | Caldwell | 210/805 |
| 2005/0109685 A1* | 5/2005 | Fujita et al. | 210/172 |
| 2005/0150826 A1* | 7/2005 | Sato et al. | 210/488 |
| 2005/0173329 A1* | 8/2005 | Iwamoto | 210/232 |
| 2006/0016741 A1* | 1/2006 | Moriyama et al. | 210/172 |
| 2006/0254974 A1* | 11/2006 | Khalil et al. | 210/420 |
| 2007/0151906 A1* | 7/2007 | Beer et al. | 210/130 |
| 2007/0246420 A1* | 10/2007 | Sato | 210/416.4 |
| 2008/0169235 A1* | 7/2008 | Goto | 210/454 |
| 2008/0185331 A1* | 8/2008 | Sato et al. | 210/435 |
| 2008/0290013 A1* | 11/2008 | Stausberg et al. | 210/167.04 |
| 2009/0039011 A1* | 2/2009 | Sato et al. | 210/491 |
| 2009/0050551 A1* | 2/2009 | Kimisawa et al. | 210/172.4 |
| 2009/0114578 A1* | 5/2009 | Pekarsky et al. | 210/123 |
| 2009/0120858 A1* | 5/2009 | Kojima et al. | 210/167.08 |
| 2009/0127174 A1* | 5/2009 | Shinbori et al. | 210/167.08 |
| 2009/0134088 A1* | 5/2009 | Morishita et al. | 210/451 |
| 2009/0139922 A1* | 6/2009 | Poskie et al. | 210/167.08 |
| 2009/0230049 A1* | 9/2009 | Stausberg et al. | 210/416.5 |
| 2009/0250410 A1* | 10/2009 | Khalil et al. | 210/767 |
| 2009/0294343 A1* | 12/2009 | Pekarsky et al. | 210/167.08 |
| 2009/0301954 A1* | 12/2009 | Beer et al. | 210/167.08 |
| 2009/0321347 A1* | 12/2009 | Ogose | 210/452 |
| 2010/0038296 A1* | 2/2010 | Beer et al. | 210/167.03 |
| 2010/0072120 A1* | 3/2010 | Sato | 210/172.4 |
| 2010/0206802 A1* | 8/2010 | Sato et al. | 210/490 |
| 2011/0180469 A1* | 7/2011 | Sato et al. | 210/172.4 |
| 2011/0192774 A1* | 8/2011 | Ogose | 210/137 |

FOREIGN PATENT DOCUMENTS

| | | |
|---|---|---|
| JP | H08-038834 | 2/1996 |
| JP | 2000-246026 | 9/2000 |
| JP | 2004-301121 | 10/2004 |
| JP | 2005-048721 | 2/2005 |

* cited by examiner

FUEL FILTER DEVICE

FIELD OF TECHNOLOGY

This invention relates to an improvement of a fuel filter device to be attached to a fuel intake port in a fuel tank.

BACKGROUND ART

Fuel inside the fuel tank is sent to a side of the internal combustion engine through an intake pipe, and the like, disposed inside this fuel tank. A filter device is attached to the fuel intake port of such intake pipe in order to remove water from the fuel thus sent and to make it such that dust is not sent into the fuel pump. As such a filter device, there is one shown in Patent Document 1 disclosed by the present applicant.

Inside the filter device of Patent Document 1, there is a bag-like filter body having an internal space which is made to connect through to the fuel intake port inside the fuel tank. Such filter body has two layers of filter materials made of nonwoven cloth produced by melt-blown method between a filter material on the outermost layer made of woven fabric mesh and a filter material on the innermost layer made of nonwoven cloth produced by spun-bond method. Also, it is made such that the average aperture size of the nonwoven cloth produced by melt-blown method positioned on the inside becomes smaller than the average aperture size of the nonwoven cloth produced by melt-blown method positioned on the outside, whereby a filtration gradient is given to the filter body. By this, while it is made such that fine dust can be captured, the burden on the filter material made of nonwoven cloth produced by melt-blown method positioned on the inside having a small average aperture size is lessened so as to achieve a long life of the filter device.

In the filter device thus constituted, by overlaying even more filter materials made of nonwoven cloth produced by melt-blown method which makes the average aperture sizes different, (the difference of average aperture sizes of adjacent filter materials is reduced) it is possible to achieve the long life of the filter device while improving the filtering precision. However, considering the manufacturing cost, and the like, of the filter body, there is a limit to the number of filter materials overlaid. Also, because the number of filter materials at the places to be welded in order to have a bag-like shape increases as the number of filter materials overlaid becomes greater, it becomes difficult to constitute an adequate filter body by such welding.

Patent Document 1: Japanese Unexamined Patent Application Publication No. 2005-48721

DISCLOSURE OF THE INVENTION

Problems to be Solved

The main problem which this invention attempts to solve is to make it possible to constitute a bag-like filter body easily and adequately while accomplishing to the extent possible improvement of filtering precision of the filter body constituting this kind of filter device and the long life thereof.

Means for Solving the Problems

In order to solve said problem, in this invention, the fuel filter device is made as a filter device having a bag-like filter body and being attached in a manner such that an internal space of this filter body connects through to a fuel intake port in a fuel tank, at least one of filter materials forming the filter body is constituted such that the cross sectional area of the fuel passage in this filter material is different between a primary side and a secondary side of this filter material so as to become a multifunctional filter material having a function of gradually capturing dust having different particle sizes.

According to such filter device, by a single such multifunctional filter material, it is possible to capture dust having different particle sizes, from coarse dust to fine dust, respectively in different places in the thickness direction of this multifunctional filter material, and it is possible to adequately remove the dust from the fuel taken thereinto in a condition such that clogging of the filter body tends not to occur.

Also, if such filter body is constituted by overlaying plural sheet-like or mat-like filter materials capable of being welded together, and after overlaying these filter materials, this is folded in two and the filter body is shaped into a bag-like form by the folded place and places other than this folded place which have been welded in a linear or band-like manner, alternatively, if two groups made by thus overlaying filter materials such that the respective sides becoming on the inside of the filter body are made to face each other, and in such condition the filter body is shaped into a bag-like form by welding these in a curved manner, then it can be made such that such welding can be accomplished easily and adequately while minimizing the number of sheets of filter materials layered in the welded places.

If such multifunctional filter material is produced by air-laid method, then a filter material of nonwoven cloth having a smooth density gradient can be obtained comparatively cheaply, and it becomes easy to cheaply supply a filter device that has high filtering precision and tends not to clog.

Also, if the cross sectional area of the fuel passages in such multifunctional filter material gradually becomes smaller toward the secondary side of this multifunctional filter material, then it becomes possible to capture in different places comparatively coarse dust on the primary side of the multifunctional filter material, comparatively fine dust on the secondary side, and dust having particle sizes between these in between.

Also, if a filter material produced by melt-blown method and having the average aperture size made smaller than the average aperture size of the multifunctional filter material is overlaid on the secondary side of such multifunctional filter material, then it is possible to constitute a filter device having long life, with the filter material made by melt-blown method by which it is easy to make the average aperture size small as a main filter, and said multifunctional filter material as a pre-filter, in a condition having minimized the burden on this main filter.

Also, if the filter material positioned on the innermost side of the filter body is made as a filter material formed by spun-bond method, then the filter body is given rigidity (stiffness) by such filter material positioned on the innermost side whereby it can be made easy to maintain the shape of the filter body.

Also, if the filter material positioned on the outermost side of the filter body is made as a woven fabric mesh, then by this woven fabric mesh it can be made such that only the fuel inside the fuel tank enters into the filter body.

EFFECT OF THE INVENTION

By this invention, with the multifunctional filter material it is possible to accomplish to the extent possible improvement of filtering precision of the filter body constituting the filter device and long life without increasing the number of overlaid filter materials. As a result, it is possible to constitute the filter device easily and adequately, as well as cheaply.

BEST MODES OF CARRYING OUT THE INVENTION

A preferred mode of working of this invention is explained below based on FIG. 1 and FIG. 2.

Figure 1:
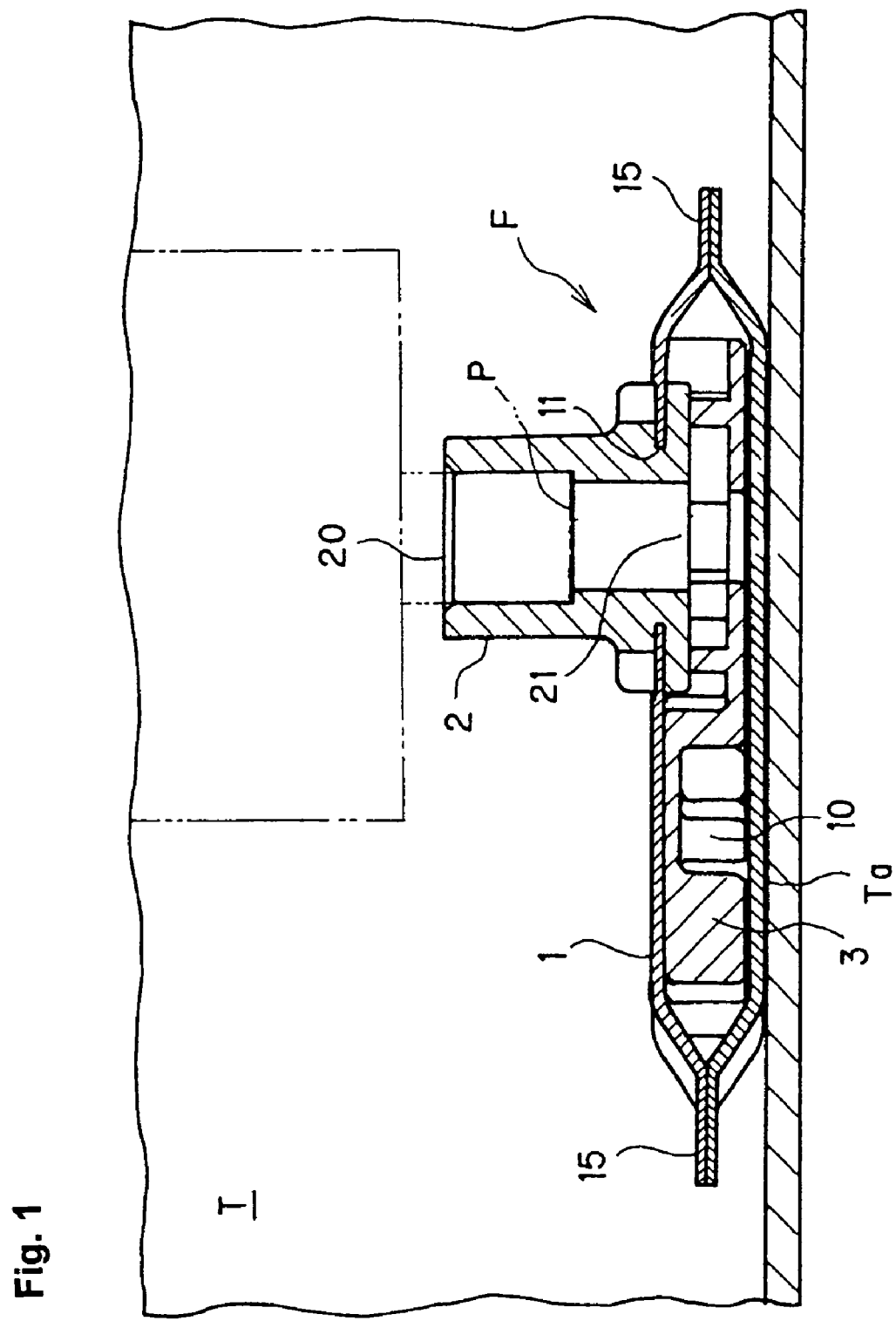
FIG. 1 is a sectional structural view showing the condition of the filter device F in use.
Figure 2:
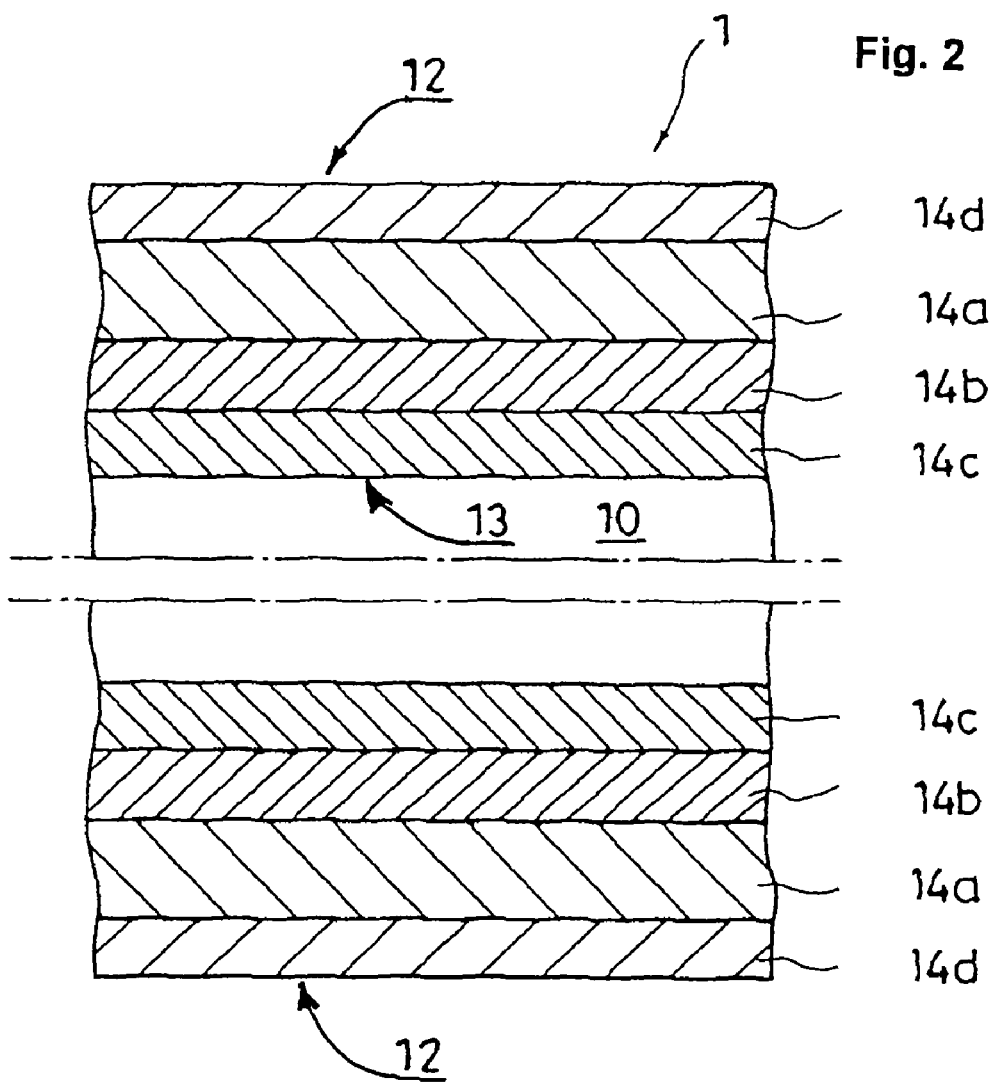
FIG. 2 is an enlarged sectional structural view showing a configuration example of the filter body 1.

Here, FIG. 1 is a structural view showing the condition in which the filter device F is attached to the fuel intake port P inside the fuel tank T; also, FIG. 2 shows one example of the cross sectional structure of the filter body 1 constituting such filter device F. (In FIG. 2, only the cross sectional structure on the upper side and the lower side of the filter body 1 is represented, and the space forming member 3 held inside the filter body 1 is omitted.)

The fuel filter device F pertaining to this mode of working is attached to the fuel intake port P inside the fuel tank T of an automobile or motorcycle, or the like, so that water and foreign matter do not exit in the fuel sent to the internal combustion engine via such fuel intake port P.

Typically, such filter device F is attached to the fuel intake port P on an intake pipe having this fuel intake port P inside the fuel tank T.

Also, sending of fuel to the internal combustion engine via such fuel intake port P is accomplished by a fuel pump disposed inside the fuel tank T or a fuel tank disposed outside the fuel tank T.

Such filter device F has a bag-like filter body 1. Also, such filter device F is attached to said fuel intake port P in a manner such that an internal space 10 of this bag-like filter body 1 connects through to this fuel intake port P.

Concretely, in the illustrated example, said filter device F has a plastic cylindrical socket body 2 having one end part 20 as an end part for connection to said fuel intake port P and an other end part 21 as an end part for connection to a connect-through hole 11 formed on said filter body 1, and it is made such that the internal space 10 of the filter body 1 is connected through to the fuel intake port P by this cylindrical socket body 2.

Also, in the illustrated example, such filter device F has a space forming member 3 which is held inside said filter body 1 and always keeps this filter body 1 in an inflated bag-like form.

Concretely, in the illustrated example, said space forming member 3 is constituted so as to have a thickness such that its upper face contacts the inner face of the upper part of the bag-like filter body 1 and its lower face contacts the inner face of the lower part of this filter body 1, and it is inserted inside the filter body 1 in a manner such that it always keeps this filter body 1 in an inflated bag-like form. On this space forming member 3, there are formed plural fuel passage parts (not illustrated) spanning between its upper face and lower face.

Also, said filter body 1 is constituted by overlaying two or more filter materials. In addition, at least one of these two or more filter materials is constituted such that the cross sectional area of the fuel passage is different between a primary side 12 and a secondary side 13 of this filter material so as to become a multifunctional filter material 14a having a function of capturing dust having different particle sizes in stages.

Here, in this specification primary side 12 of the filter material means the side of this filter material positioned on the outside of the filter body, being the inflow side (upstream side) of the fuel into this filter material; also, secondary side 13 of the filter material means the side of this filter material positioned on the inside of the filter body, being the outflow side (downstream side) of the fuel from this filter material.

By this, according to the filter device F, by a single such multifunctional filter material 14a, it is possible to capture dust having different particle sizes, from coarse dust to fine dust, respectively in different places in the thickness direction of this multifunctional filter material, and it is possible to adequately remove the dust from the fuel taken thereinto in a condition such that clogging of the filter body 1 tends not to occur.

Also, if such filter body 1 is constituted by overlaying plural sheet-like or mat-like filter materials capable of being welded together, and after overlaying these filter materials, this is folded in two and the filter body 1 is shaped into a bag-like form by the folded place and the places other than this folded place which has been welded in a linear or band-like manner, alternatively, if two groups made by thus overlaying filter materials such that the respective sides becoming on the inside of the filter body 1 are made to face each other, and in such condition the filter body 1 is shaped into a bag-like form by welding these in a curved manner, then it can be made such that such welding can be accomplished easily and adequately while minimizing the number of sheets of filter materials layered in the welded places.

That is, when layering two or more filter materials making different the cross sectional areas of the fuel channels, that is, the average aperture sizes of the aperture sizes of the fine fuel passage holes in the filter materials, and shaping it into a bag-like filter body 1 by such welding, the number of sheets of filter materials layered in its welded places becomes a problem, and it becomes difficult to integrate these by welding. In the filter device pertaining to this mode of working, with a single such multifunctional filter material 14a it is possible to constitute a filter body 1 in which clogging tends not to occur in a mode in which such welding/integration is easy to perform.

In this mode of working, such multifunctional filter material 14a is constituted as nonwoven cloth, and it is made such that the cross sectional area of the fuel passages in this multifunctional filter material 14a gradually becomes smaller toward the secondary side 13 of this multifunctional filter material 14a. By this, in this mode of working, it is made so as to capture in different places comparatively coarse dust on the primary side 12 of the multifunctional filter material 14a, comparatively fine dust on the secondary side 13, and dust having particle sizes between these in between.

If such multifunctional filter material 14a was produced by air-laid method (also called air-laying, and the like) which is a dry method of production of nonwoven cloth, then a filter material 14a of nonwoven cloth having a smooth density gradient can be obtained comparatively cheaply, and it becomes easy to cheaply supply a filter device that has high filtering precision and tends not to clog.

Also, in this mode of working, a filter material 14b produced by melt-blown method and having the average aperture size made smaller than the average aperture size of the multifunctional filter material 14a is overlaid on the secondary side 13 of such multifunctional filter material 14a.

By this, in this mode of working, it is possible to constitute a filter device having long life, with the filter material 14b of nonwoven cloth made by melt-blown method by which it is easy to make the average aperture size small as a main filter, and said multifunctional filter material 14a as a pre-filter, in a condition having minimized the burden on this main filter.

Also, in this mode of working, the filter material positioned on the innermost side of the filter body 1 is made as a filter material 14c formed by spun-bond method.

When it is made as such, the filter body 1 is given rigidity (stiffness) by such filter material 14c formed by spun-bond method whereby it can be made easy to maintain the shape of the filter body 1. Also, it is made such that a filter material 14 formed by melt-blown method does not contact said space forming member 3, but the filter material 14c formed by spun-bond method having higher rigidity contacts the space forming member 3.

Also, in this mode of working, the filter material positioned on the outermost side of the filter body 1 is made as a woven fabric mesh 14d. When it is made as such, by the woven fabric mesh 14d positioned on the outermost side of such filter body 1, water contained in the fuel can be separated from the fuel whereby it can be made such that the water does not enter into the filter body 1; also, even if rubbing occurs between the lower face part of the filter body 1 and the lower part inner wall surface Ta of the fuel tank T accompanying inward and outward movement of the lower part inner wall surface Ta of this fuel tank T due to internal pressure change, and the like, of this fuel tank T (that is, accompanying expansion and contraction of the fuel tank T), it can be made such that the multifunctional filter material 14a made of nonwoven cloth is not directly affected by it.

Such woven fabric mesh 14d typically is constituted by thoroughly weaving synthetic fiber such as nylon fiber, polyethylene fiber or polypropylene fiber so as to have a sufficiently fine mesh for oil-water separation. Such woven fabric mesh 14d can be constituted, for example, by Dutch weave, plain weave, twilled weave, satin weave, and the like.

Each filter material 14a-14d constituting the filter body 1 can be constituted using the same synthetic fiber material. For example, each such layer can be constituted using polypropylene or constituted using nylon.

When it is made as such, it is possible to constitute a bag-like filter body 1 integrated with good compatibility by welding together each filter material 14a-14d overlaid.

In the example shown in FIG. 2, a filter body 1 is constituted by making the outermost layer of the filter body 1 as woven fabric mesh 14d and the innermost layer as filter material 14c formed by spun-bond method, and inserting a main filter and pre-filter between the two such that the pre-filter (multifunctional filter material 14a) is positioned on the side of the woven fabric mesh 14d and the main filter (filter material 14b formed by melt-blown method) is positioned on the side of the filter material 14c formed by spun-bond method.

The filter body 1 pertaining to the illustrated example can be constituted by folding in two from the state in which the filter materials 14a-14d are overlaid, such that the filter material 14c formed by spun-bond method is positioned inside, and inserting the space forming member 3, and after this forming a heat seal part (welded place 15) across the edge part excluding the folded edge part, or along the edge part excluding this folded edge part, inside of this edge part, to integrate the one side with the other side being overlaid together by folding in two. The connect-through hole 11 to said cylindrical socket body 2 is punched in advance in the four filter materials 14a-14d overlaid thus, before such folding in two.

Alternatively, the filter body 1 pertaining to the illustrated example can be constituted by overlaying a first filter material group made by overlaying four filter materials 14a-14d as previously noted and a second filter material group made by overlaying four filter materials 14a-14d as previously noted, such that the filter material 14c formed by spun-bond method of the first filter material group and the filter material 14c formed by spun-bond method of the second filter material group are made to face each other, and inserting said space forming member 3 between the two, and after this forming a heat seal part around the outer periphery of the space forming member 3 inserted between, to integrate the first filter material group and the second filter material group. The connect-through hole 11 to said cylindrical socket body 2 is punched in advance in the first filter material group or the second filter material group.

Spot welding furthermore may be suitably applied to the filter body 1 formed thus in advance of that formation, so as to integrate each filter material 14a-14d constituting the filter body 1 except said heat seal part.

Also, the unnecessary part located outside of said heat seal part 15 is cut according to need to trim the shape of the filter body 1.

The entire contents of the Specification, Claims, Drawings and Abstract of Japanese Patent Application 2007-002491 filed on Jan. 10, 2007 are cited here and are incorporated as a disclosure of the specification of the present invention.

What is claimed is:

1. A fuel filter for filtering fuel in a fuel tank comprising:
a filter bag body having an opening, said body including:
   an outermost synthetic woven fabric mesh filtration layer constructed and arranged such that it does not permit water to pass through it and enter an interior space defined by the filter bag body;
   an air-laid nonwoven cloth multifunctional filtration layer adjacent to said outermost synthetic woven fabric mesh filtration layer, said multifunctional filtration layer having a porosity gradient wherein apertures or fuel passages contained therein gradually become smaller in cross-section across the depth of the multifunctional filtration layer in a direction as fuel flows toward the interior space;
   a melt-blown filtration material layer having an average aperture size that is smaller than an average aperture size of said multifunctional filtration layer which is adjacent thereto; and
   an innermost spun-bond filtration material layer adjacent said melt-blown filtration material layer and having sufficient rigidity such that it maintains a predetermined shape of the filter bag body, wherein each of the layers making up said filter bag body is connected by welds;
a plastic cylindrical socket body constructed, at one end for connection to a fuel intake port and, at the other end has an end part for connection to said opening in said filter bag body, wherein said interior space is placed in fluid communication with said fuel intake port via a through hole extending between said ends of said plastic cylindrical socket body; and
a space forming member within the interior space of said filter bag body.

* * * * *